United States Patent
Hou et al.

(10) Patent No.: US 7,006,415 B2
(45) Date of Patent: Feb. 28, 2006

(54) SAMPLING CLOCK GENERATOR FOR BCA DATA DECODING

(75) Inventors: Kuen-Suey Hou, Yun Lin (TW); Kun-Hung Hsieh, Hsin Chu (TW)

(73) Assignee: Media Tek Inc., Hsin Chu (TW)

( * ) Notice: Subject to any disclaimer, the term of this patent is extended or adjusted under 35 U.S.C. 154(b) by 505 days.

(21) Appl. No.: 10/345,301

(22) Filed: Jan. 16, 2003

(65) Prior Publication Data

US 2004/0066723 A1  Apr. 8, 2004

(30) Foreign Application Priority Data

Oct. 4, 2002  (TW) .............................. 91123157 A (51) Int. Cl.
*G11B 7/00* (2006.01)
(52) U.S. Cl. ................ 369/52.1; 369/53.34; 369/53.16
(58) Field of Classification Search ..................... None
See application file for complete search history.

(56) References Cited

U.S. PATENT DOCUMENTS

| | | | |
|---|---|---|---|
| 6,034,934 A | 3/2000 | Miyake et al. | |
| 6,034,937 A * | 3/2000 | Kumagai | 369/47.26 |
| 6,266,299 B1 * | 7/2001 | Oshima et al. | 369/13.38 |
| 6,414,920 B1 * | 7/2002 | Lee | 369/47.31 |
| 2002/0057638 A1 * | 5/2002 | Chou et al. | 369/53.35 |
| 2002/0060968 A1 * | 5/2002 | Senshu | 369/59.25 |

* cited by examiner

*Primary Examiner*—Brian E. Miller
*Assistant Examiner*—Peter Vincent Agustin
(74) *Attorney, Agent, or Firm*—Birch, Stewart, Kolasch & Birch, LLP (57) ABSTRACT

A sampling clock generator for BCA data decoding providing a sampling clock, which is proportional to the actual rotation speed of a disk. The sampling clock generator includes a frequency counter, a divider and a frequency divider. The frequency counter counts the number of pulses of a reference clock for each period of a rotation speed indicating signal of a spindle motor and generates a counting value. The divider divides the counting value by a predefined value and generates a divided value. The frequency divider is employed to generate the sampling clock. The frequency divider receives the reference clock and divides the frequency of the reference clock by the divided value to generate the sampling clock. The frequency divider also adjusts the phase of the sampling clock according to the BCA reproducing signal.

12 Claims, 7 Drawing Sheets

SAMPLING CLOCK GENERATOR FOR BCA DATA DECODING

FIELD OF THE INVENTION

The invention relates generally to a sampling clock generator for BCA data decoding, and in particular to a sampling clock generator for BCA data decoding using a speed indicating signal of a spindle motor to generate a sampling clock.

DESCRIPTION OF THE RELATED ART

Figure 1:
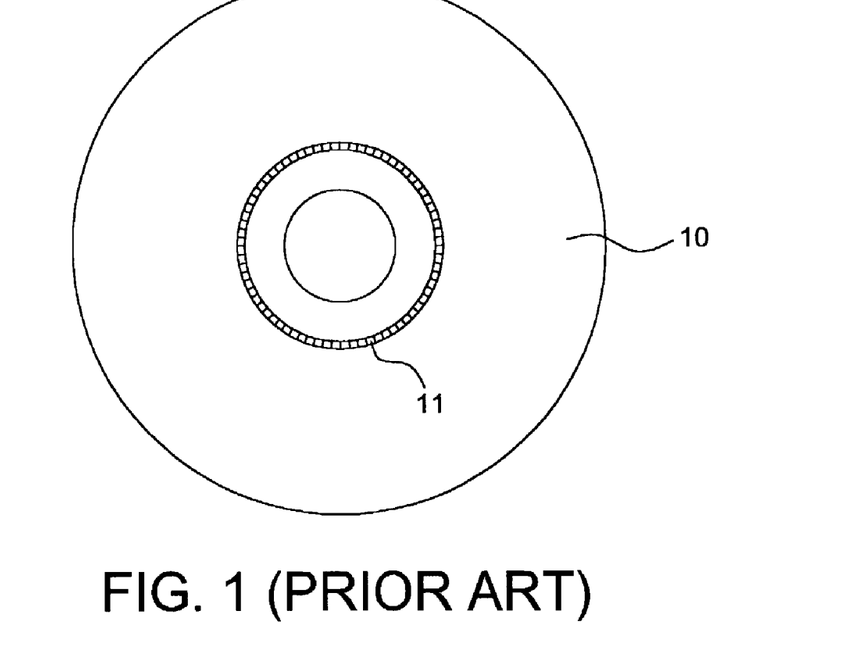
FIG. 1 is a schematic illustration showing the BCA on an optical disk.
Figure 2:
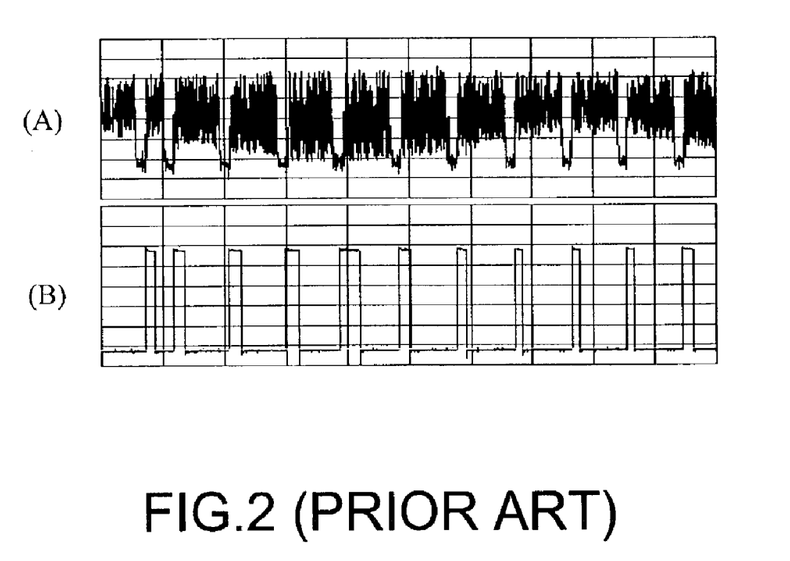
FIG. 2(A) shows the RF signal acquired from the optical disk.
FIG. 2(B) shows BCA reproducing signal generated using a BCA signal reproduction device to process the RF signal.

Currently, digital video optical disks or digital versatile disks (hereinafter referred to as DVDs) include DVD-ROM (Read Only Memory), DVD-R (Recordable), and DVD-RAM (Random Access Memory). In the development of DVD-ROM, a burst cutting area (BCA) is provided on the optical disk for data writing so as to mark individual information on each optical disk. As shown in FIG. 1, the BCA 11 of the optical disk 10 is positioned away from the disk center by 22.3 (+0/−0.4) mm to 23.50±0.5 mm. Each BCA data bit is encoded from two BCA channel bits. Channel bits "10" represent a data bit "0," while channel bits "01" represent a data bit "1." In the BCA data writing method, a laser beam is employed to remove the reflection film on a portion of the BCA in a radiation direction. The length and gap of the removed reflection film is dominated by the RZ (Return to Zero) modulation of the channel bit. Since a dummy pit string already exists in the original BCA, the RF (radio frequency) signal read by the optical head for the BCA data includes not only a BCA stripe signal but also a high-frequency pit string signal, as shown in FIG. 2(A). Thereafter, a BCA signal reproduction device is employed to process the RF signal and to generate the BCA reproducing signal, as shown in FIG. 2(B).

Figure 3:
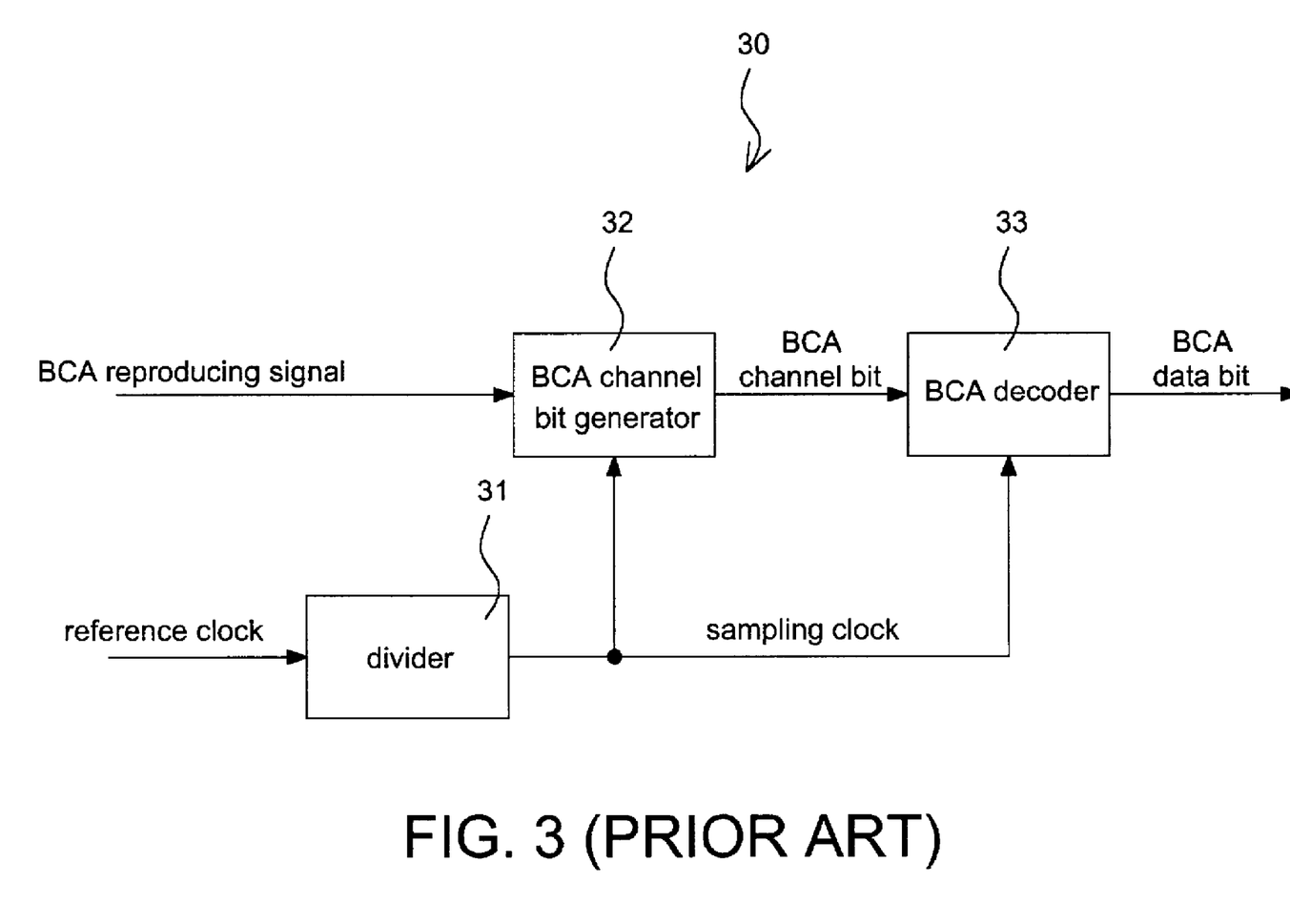
FIG. 3 is a block diagram showing a conventional apparatus for retrieving the BCA signal.

FIG. 3 is a block diagram showing a conventional apparatus for retrieving the BCA signal. As shown in FIG. 3, the BCA data bit retrieving device 30 utilizes a BCA channel bit generator 32 to sample the BCA reproducing signal based on a sampling clock. The BCA reproducing signal is then subjected to a RZ demodulation to become a BCA channel bit. Next, the BCA decoder 33 decodes the BCA channel bit to generate a BCA data bit. One method for generating a sampling clock is to use a reference clock whose frequency is divided in the frequency divider 31. However, the method has to make sure that the disk rotating speed meets a predefined value. If the disk rotating speed deviates from the predefined value, the BCA channel bit generator 32 may not correctly sample the BCA reproducing signal based on the sampling clock because the frequency of the BCA reproducing signal changes with the variation of the disk rotating speed.

Although a PLL (Phase Locked Loop) circuit may be employed to generate the sampling clock according to the BCA reproducing signal, the PLL circuit is complicated and expensive. In addition, U.S. Pat. No. 6,034,934, entitled "DISC REPRODUCTION APPARATUS," also discloses a method for generating the sampling clock by calculating the edge interval. In such a method, however, additional firmware or circuitry is required, and the cost thereof is high accordingly.

SUMMARY OF THE INVENTION

In view of the above-mentioned problems, an object of the invention is to provide a sampling clock generator for BCA data decoding using a FG signal (spindle motor speed indicating signal) of the spindle motor to generate a sampling clock.

To achieve the above-mentioned object, the sampling clock generator of the invention includes a frequency counter, a divider and a variable frequency divider. The frequency counter receives a FG signal, counts a number of pulses of a reference clock corresponding to each period of the FG signal, and generates a counting value. The divider receives the counting value of the frequency counter and divides the counting value by a predefined value to generate a divided value. The variable frequency divider receives the reference clock, a BCA reproducing signal and the divided value, divides the frequency of the reference clock using the divided value as a divisor of the variable frequency divider to generate the sampling clock, and adjusts the phase of the sampling clock based on the BCA reproducing signal.

DETAILED DESCRIPTION OF THE INVENTION

The sampling clock generator for BCA data decoding of the invention will be described with reference to the accompanying drawings.

Figure 4:
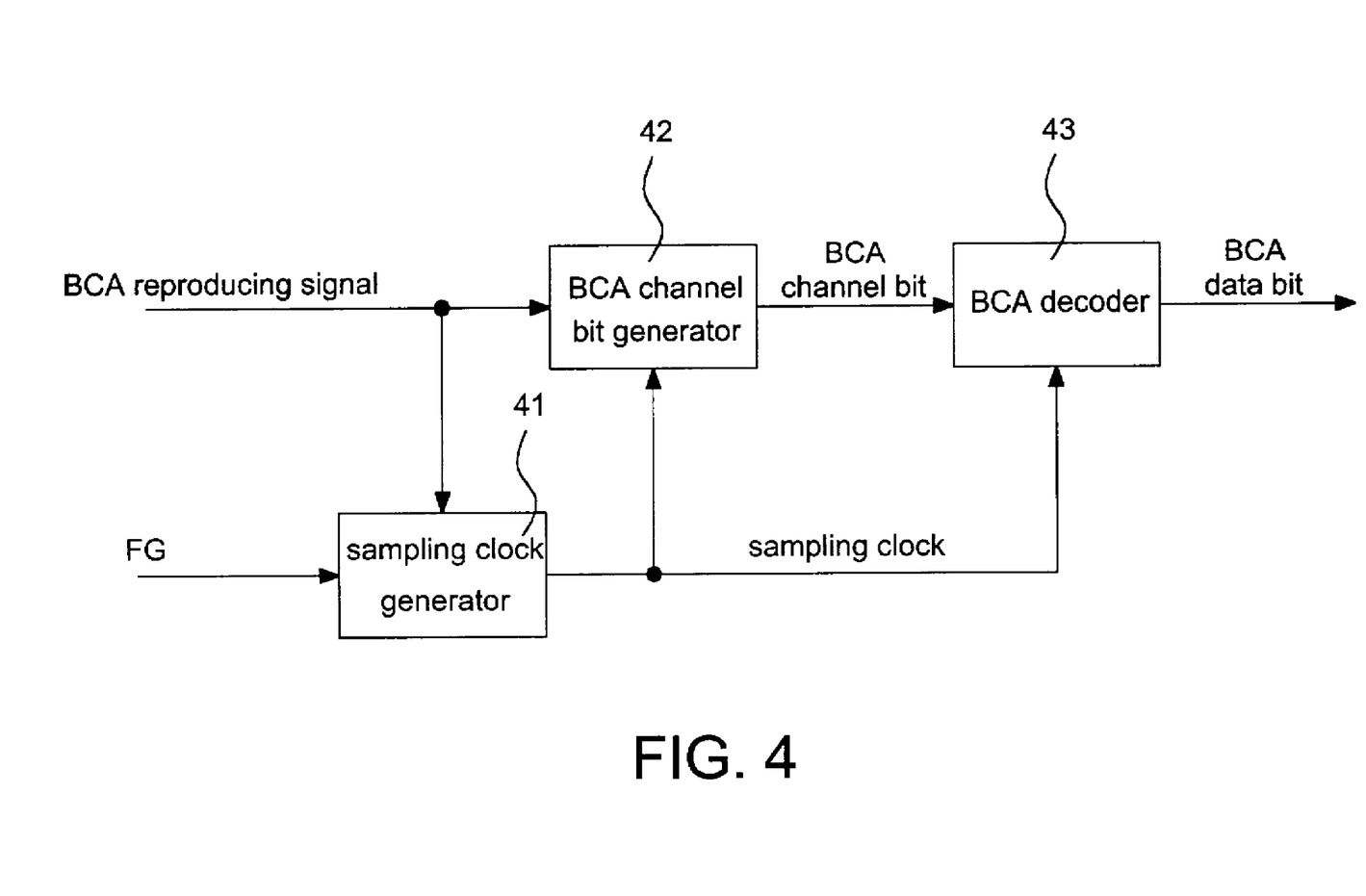
FIG. 4 is a block diagram showing the implementation architecture of the sampling clock generator for BCA data decoding according to the invention.

FIG. 4 is a block diagram showing the implementation architecture of the sampling clock generator for BCA data decoding according to the invention. Referring to FIG. 4, the sampling clock generator 41 for BCA data decoding of the invention receives a spindle-motor-speed indicating signal FG and a BCA reproducing signal to generate a sampling clock for BCA data decoding. The sampling clock is supplied to the BCA channel bit generator 42 and the BCA decoder 43. Therefore, the BCA channel bit generator 42 samples the correct BCA channel bit and the BCA decoder 43 decodes the correct BCA data bit based on the sampling clock.

According to the BCA specification, the BCA channel bit rate is 1/(8.89 μs) or 112.49 KHz at the disk rotating speed of 1440 rpm (24 Hz). However, if the disk rotating speed deviates from 1440 rpm, the BCA channel bit rate will also deviate from 112.49 KHz. For example, the BCA channel bit rate is 1/(9.85 μs) or 101.55 KHz at a disk rotating speed of 1300 rpm (21.67 Hz). Hence, if the BCA channel bit generator uses a sampling clock with a constant frequency to retrieve the BCA channel bit data, the BCA channel bit data may be correctly retrieved at a standard disk rotating speed. However, if the disk rotating speed deviates far from the standard disk rotating speed, the retrieved BCA channel bit data may be incorrect.

It is assumed that the period of the spindle-motor-speed indicating signal FG is 1/(24*N), wherein N is an integer, such as 3, 4, 6, and the like, depending on different spindle motor designs. In this case, a period of the spindle-motor-speed indicating signal FG has about 4678/N (i.e., 1/(24*N)/(8.89*10$^{-6}$)) BCA channel bits. Since the BCA channel bit rate is directly proportional to the frequency of the spindle-motor-speed indicating signal FG, a sampling clock for BCA data decoding with a correct frequency can be provided as long as the frequency of the spindle-motor-speed indicating signal FG is computed based on the relationship of (4678/N).

Figure 5:
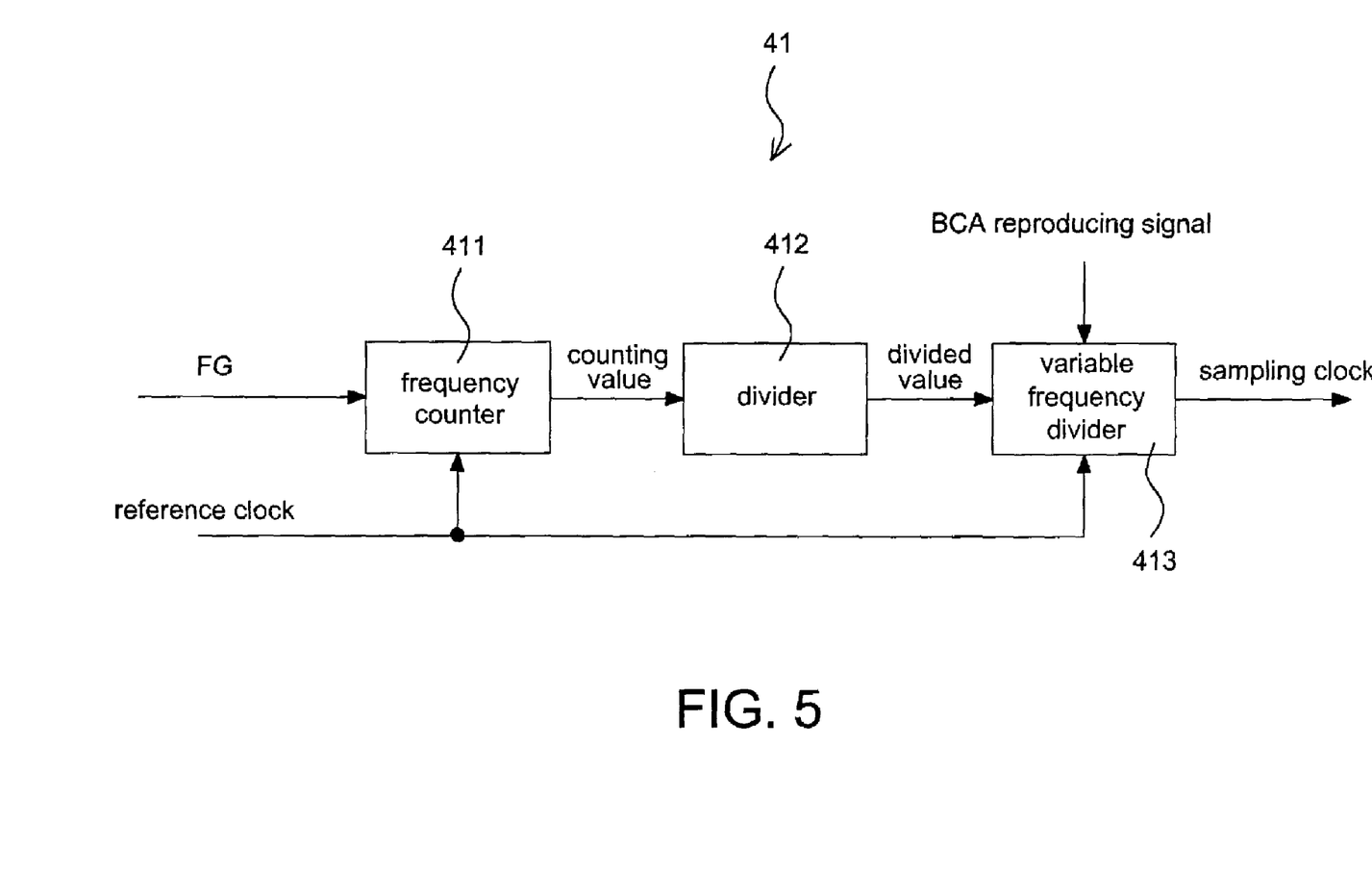
FIG. 5 is a block diagram showing the sampling clock generator for BCA data decoding according to a first embodiment of the invention.

FIG. 5 is a block diagram showing the sampling clock generator for BCA data decoding according to a first embodiment of the invention. The sampling clock generator 41 includes a frequency counter 411, a divider 412, and a variable frequency divider 413 with a variable divisor. Because the invention utilizes a reference clock as a standard clock to generate a sampling clock, the frequency of the reference clock has to be higher than that of the spindle-motor-speed indicating signal FG and that of the sampling clock. For example, the frequency of the reference clock may be 33 MHz. First, the frequency counter 411 receives the spindle-motor-speed indicating signal FG and the reference clock, and counts the number of pulses of the reference clock corresponding to each period of the spindle-motor-speed indicating signal FG to generate a counting value. For example, when the disk rotating speed is 1440 rpm and N is 4, the counting value is about 343.75 K. Next, the divider 412 divides the counting value to scale down the counting value into a divided value. For example, the divisor of the divider 412 is defined according to the relation of the frequency of the spindle-motor-speed indicating signal FG and the BCA channel bit rate, such as about 4678/N. For example, if N is 4, the divisor is about 1196. Consequently, the divided value outputted from the divider 412 is about 287 in this embodiment. Finally, the variable frequency divider 413 divides the frequency of the reference clock according to the divided value to generate a sampling clock. The sampling clock has a frequency substantially equal to 115 KHz in this embodiment. The frequency of 115 KHz deviates from the required frequency 112.5 KHz of the sampling clock by less than 5%. This frequency deviation of less than 5% can be compensated using the design of the variable frequency divider by adjusting the phase in order to prevent the channel bit from being incorrectly sampled.

In addition, the frequency of the sampling clock obtained from the sampling clock generator of the invention changes proportionally to the frequency of the spindle-motor-speed indicating signal FG, because the frequency of the spindle-motor-speed indicating signal FG changes with the disk rotating speed. For example, when the disk rotating speed is decreased to 1300 rpm (the variation rate is 10.3%), the counting value in this embodiment substantially becomes 381 K, the divided value becomes 318, and the frequency of the sampling clock becomes 103.8 KHz. Consequently, the frequency of the sampling clock correspondingly decreases 10.3%, and then the system may generate a correct frequency of the sampling clock corresponding to the rotating speed.

Figure 6:
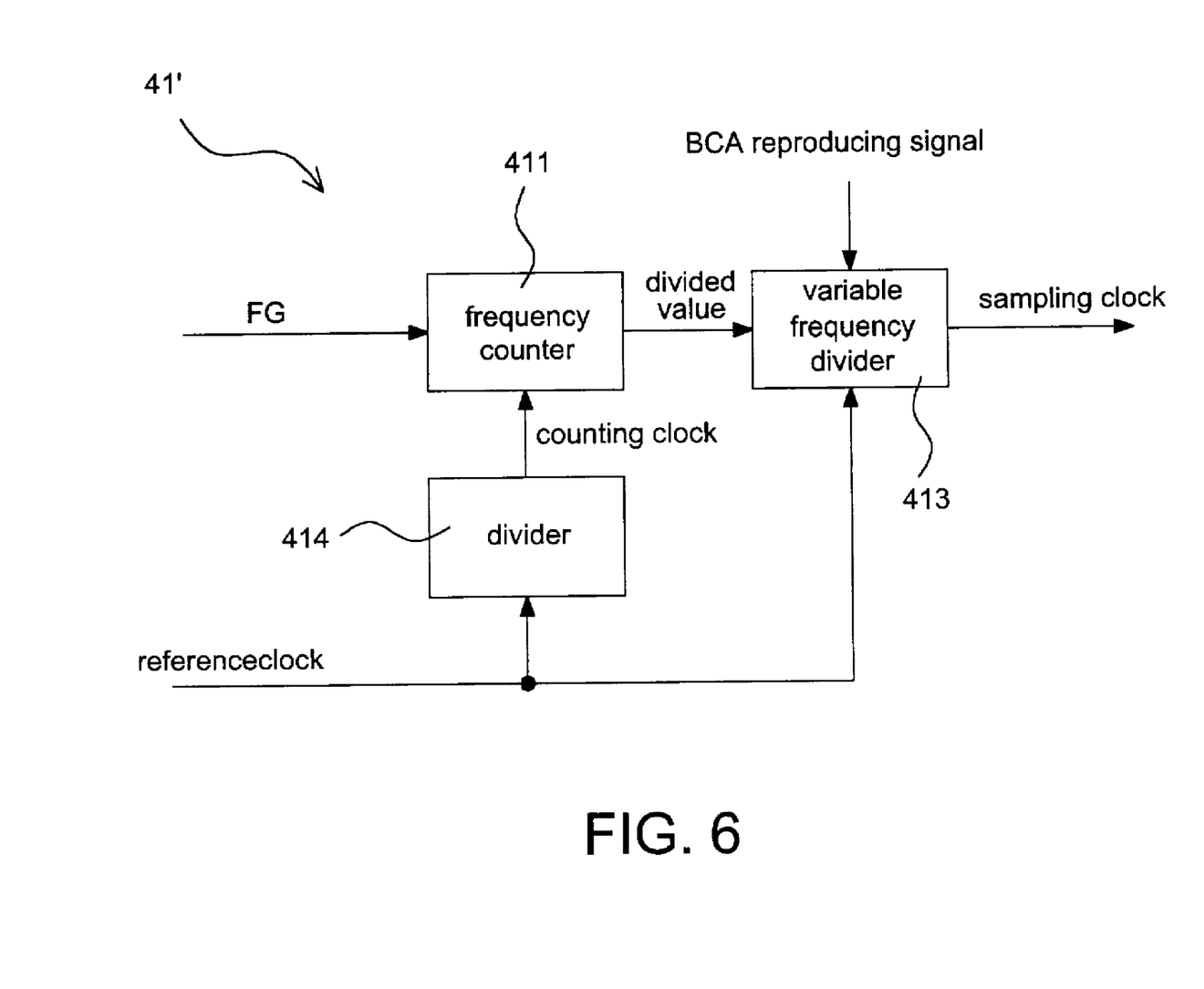
FIG. 6 is a block diagram showing the sampling clock generator for BCA data decoding according to a second embodiment of the invention.

FIG. 6 is a block diagram showing the sampling clock generator for BCA data decoding according to a second embodiment of the invention. In the first embodiment, the sampling clock generator 41 utilizes the frequency counter to generate a counting value, which is then divided by a predefined value to become a divided value. In the second embodiment, however, the sampling clock generator 41' divides the frequency of the reference clock to generate a counting clock, and then utilizes a frequency counter to generate a divided value. The sampling clock generator 41' includes a frequency divider 414, a frequency counter 411, and a variable frequency divider 413 with a variable divisor. Because the invention utilizes a reference clock as a standard clock to generate a sampling clock, the frequency of the reference clock has to be higher than that of the spindle-motor-speed indicating signal FG and that of the sampling clock. For example, the frequency of the reference clock may be 33 MHz. First, the sampling clock generator 41' utilizes the frequency divider 414 to divide the frequency of the reference clock and to generate a counting clock. The frequency divisor of the frequency divider 414 is defined according to relation of the frequency of the spindle-motor-speed indicating signal FG and the BCA channel bit rate, such as about 4678/N. In the second embodiment, for example, the divided value is 1196. Consequently, the frequency of the counting clock generated from the frequency divider 414 is 27.59 KHz. Thereafter, the frequency counter 411 receives the spindle-motor-speed indicating signal FG and counting clock, counts the number of pulses of the counting clock corresponding to each period of the spindle-motor-speed indicating signal FG, and generates a divided value accordingly. For example, when the disk rotating speed is 1440 rpm and N is 4, the divided value is about 287. Finally, the variable frequency divider 413 divides the frequency of the reference clock according to the divided value to generate a sampling clock. The sampling clock has a frequency substantially equal to 115 KHz in this embodiment. The frequency of 115 KHz in this embodiment deviates from the required frequency 112.5 KHz of the sampling clock by less than 5%. This frequency deviation of less than 5% may be compensated using the design of the variable frequency divider by adjusting the phase to prevent the channel bit from being incorrectly sampled. Of course, if the system provides a reference clock with two different frequencies, the frequency divider 414 may be omitted. For example, if the system provides a counting clock and a reference clock whose frequency are integral multiples of the frequency of the counting clock, the frequency divider 414 can be omitted.

Figure 7:
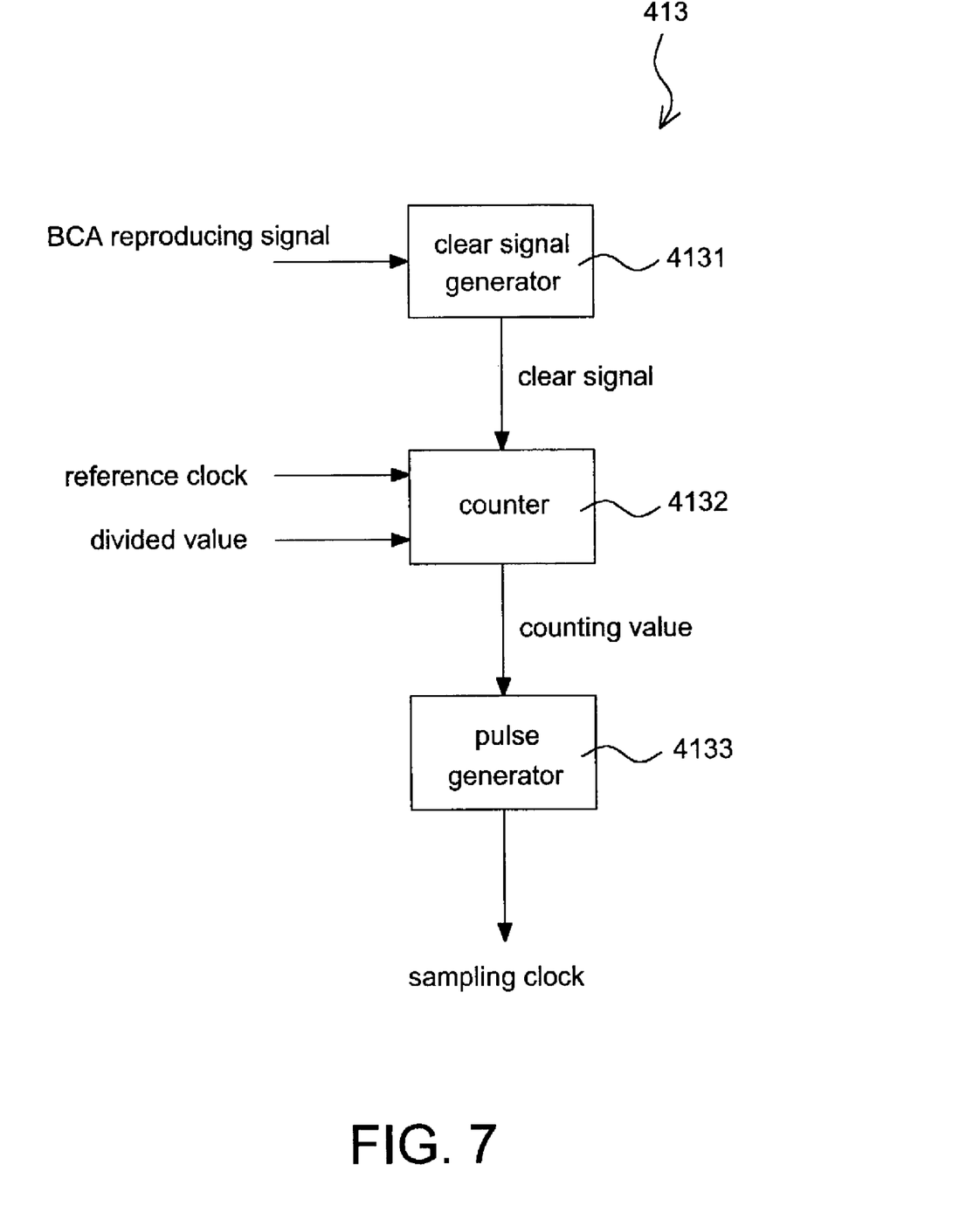
FIG. 7 is a block diagram showing a variable frequency divider of the sampling clock generator for BCA data decoding according to the invention.

FIG. 7 is a block diagram showing a variable frequency divider. Referring to FIG. 7, the variable frequency divider 413 includes a clear signal generator 4131, a counter 4132, and a pulse generator 4133. The variable frequency divider 413 utilizes the BCA reproducing signal to adjust the phase of the sampling clock so that the generated sampling clock may have a better sampling phase and a minute frequency error in the sampling clock may also be compensated. The variable frequency divider 413 utilizes the clear signal generator 4131 to generate a clear signal according to the BCA reproducing signal. For example, a pulse of a clear signal may be generated at the rising edge of each BCA reproducing signal. The counter 4132 receives the reference clock and the divided value to generate a counting value. The counter 4132 is reset when the counting value equals to the divided value or when the pulse of the clear signal is received. The pulse generator 4133 receives the counting value of the counter 4132, and generates a pulse on the sampling clock when the counting value equals to "A." The pulse width of the sampling clock may be designed according to the requirements. For example, the pulse generator 4133 may output a signal of HIGH when the counting value is between "A" and "A+B," and output a signal of LOW when the counting value is not between "A" and "A+B."

Figure 8:
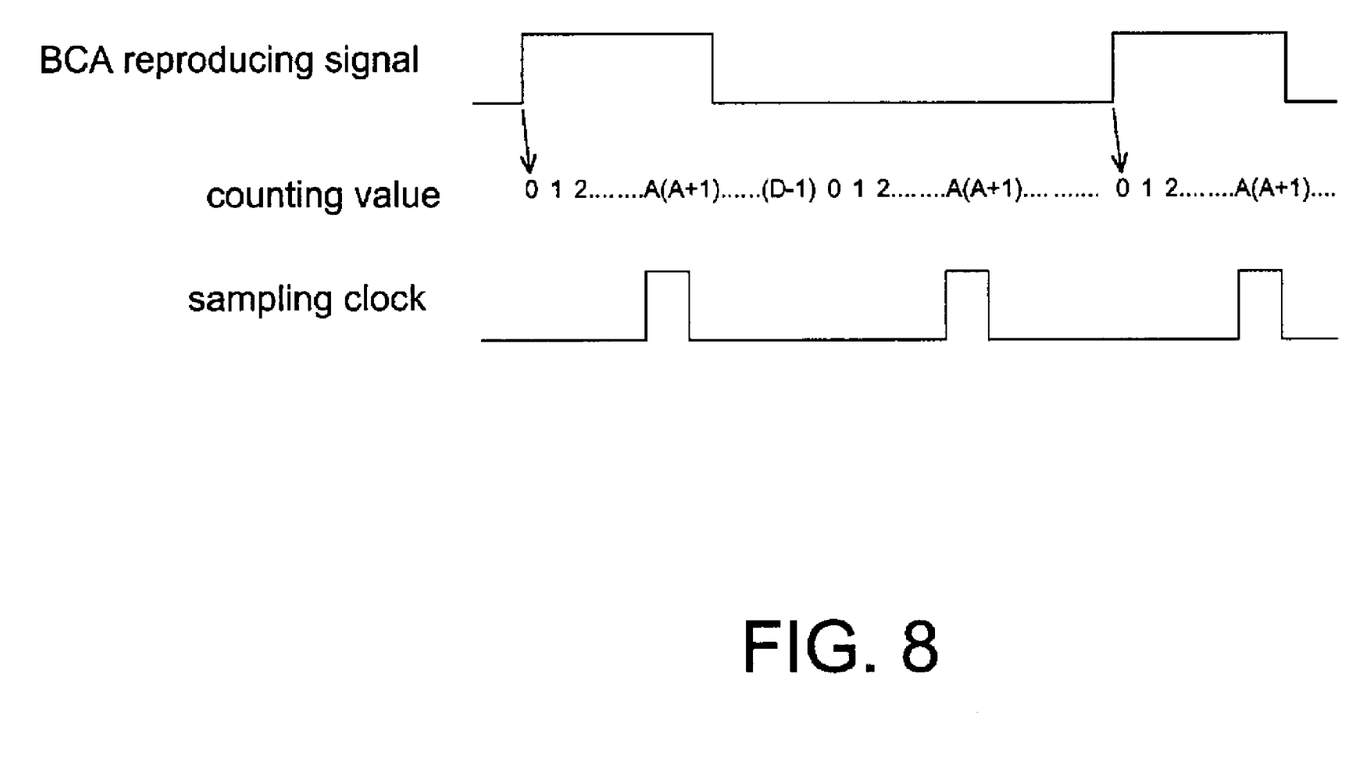
FIG. 8 is a schematic illustration showing the relation of the BCA reproducing signal, counting value and sampling clock.

FIG. 8 is a schematic illustration showing the relation of the BCA reproducing signal, counting value and sampling clock. As shown in FIG. 8, the counting value is cleared and reset to 0 at the rising edge of the BCA reproducing signal. Then, when the counting value is "A," the sampling clock generates a pulse. Next, when the counting value is counted to "D" (D is a divided value), the counter is reset to 0 and recount. Since the variable frequency divider 413 utilizes the BCA reproducing signal to adjust the phase, the generation of the sampling clock will never be influenced even if some errors occur in the divided value.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. A sampling clock generator for BCA data decoding, comprising:
   a frequency counter for receiving a rotation speed indicating signal and a reference clock, counting a number of pulses of the reference clock corresponding to each period of the rotation speed indicating signal, and generating a first counting value;
   a divider for receiving the first counting value of the frequency counter, dividing the first counting value by a first predefined value, and generating a divided value; and
   a variable frequency divider for receiving the reference clock, a BCA reproducing signal and the divided value and generating a sampling clock by dividing frequency of the reference clock using the divided value as a divisor, the variable frequency divider also adjusting the phase of the sampling clock according to the BCA reproducing signal.

2. The sampling clock generator according to claim 1, wherein the rotation speed indicating signal is generated by a spindle motor controller of an optical disk player.

3. The sampling clock generator according to claim 1, wherein the variable frequency divider comprises:
   a clear signal generator for generating a clear signal according to the BCA reproducing signal;
   a counter for receiving the reference clock and the divided value, outputting a second counting value, and clearing the second counting value when the clear signal is enabled; and
   a pulse generator for receiving the second counting value and generating a sampling pulse on the sampling clock when the second counting value equals a predefined second value.

4. The sampling clock generator according to claim 3, wherein the clear signal generator enables the clear signal for a period of time at a rising edge of the BCA reproducing signal.

5. A sampling clock generator for BCA data decoding, comprising:
   a frequency divider for receiving a reference clock, dividing the reference clock by a first predefined value, and generating a counting clock;
   a frequency counter for receiving a rotation speed indicating signal, counting a number of pulses of the counting clock corresponding to each period of the rotation speed indicating signal, and generating a divided value; and
   a variable frequency divider for receiving the reference clock, a BCA reproducing signal and the divided value to generate a sampling clock by dividing frequency of the reference clock using the divided value as a divisor, the variable frequency divider also adjusting the phase of the sampling clock according to the BCA reproducing signal.

6. The sampling clock generator according to claim 5, wherein the rotation speed indicating signal is generated by a spindle motor driver.

7. The sampling clock generator according to claim 5, wherein the variable frequency divider comprises:
   a clear signal generator for generating a clear signal according to the BCA reproducing signal;
   a counter for receiving the reference clock and the divided value, outputting a counting value, and clearing the counting value when the clear signal is enabled; and
   a pulse generator for receiving the counting value and generating a sampling pulse on the sampling clock when the counting value equals to a second predefined value.

8. The sampling clock generator according to claim 7, wherein the clear signal generator enables the clear signal for a period of time at a rising edge of the BCA reproducing signal.

9. A sampling clock generator for BCA data decoding, comprising:
   a frequency counter for receiving a rotation speed indicating signal and a first reference clock, counting a number of pulses of the first reference clock corresponding to each period of the speed indicating signal, and outputting a divided value; and
   a variable frequency divider for receiving a second reference clock, a BCA reproducing signal and the divided value and generating a sampling clock by dividing frequency of the second reference clock using the divided value as a divisor and adjusting the phase of the sampling clock according to the BCA reproducing signal.

10. The sampling clock generator according to claim 9, wherein the frequency of the first reference clock and the frequency of the second reference clock are positive integral multiples of a third reference clock.

11. The sampling clock generator according to claim 9, wherein the divided value is a function of the number of pulses of the first reference clock corresponding to each period of the rotation speed indicating signal.

12. The sampling clock generator according to claim 9, wherein the rotation speed indicating signal is generated by a spindle motor controller of an optical disk player.

* * * * *